United States Patent
Schuler et al.

(10) Patent No.: US 6,399,022 B1
(45) Date of Patent: Jun. 4, 2002

(54) SIMPLIFIED OZONATOR FOR A SEMICONDUCTOR WAFER CLEANER

(75) Inventors: Malcolm R. Schuler; Rodney S. Ridley; Thomas E. Grebs, all of Mountaintop, PA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/663,235

(22) Filed: Sep. 15, 2000

Related U.S. Application Data

(63) Continuation-in-part of application No. 09/344,867, filed on Jun. 28, 1999, now Pat. No. 6,314,974.

(51) Int. Cl.[7] ................................................ B08B 3/00
(52) U.S. Cl. ........................ 422/24; 422/29; 422/129; 134/2
(58) Field of Search ................ 134/2; 422/24, 422/29, 129

(56) References Cited

U.S. PATENT DOCUMENTS

| | | |
|---|---|---|
| 4,118,649 A | 10/1978 | Shwartzman et al. |
| 4,326,553 A | 4/1982 | Hall |
| 4,543,130 A | 9/1985 | Shwartzman |
| 4,736,759 A | 4/1988 | Coberly et al. |
| 4,736,760 A | 4/1988 | Coberly et al. |
| 4,804,007 A | 2/1989 | Bran |
| 4,854,337 A | 8/1989 | Bunkenburg et al. |
| 4,869,278 A | 9/1989 | Bran |
| 4,979,994 A | 12/1990 | Dussault et al. |
| 4,998,549 A | 3/1991 | Bran |
| 5,037,481 A | 8/1991 | Bran et al. |
| 5,090,432 A | 2/1992 | Bran |
| 5,143,103 A | 9/1992 | Basso et al. |
| 5,148,823 A | 9/1992 | Bran |
| 5,247,954 A | 9/1993 | Grant et al. |
| 5,286,657 A | 2/1994 | Bran |
| 5,326,539 A | 7/1994 | Taylor |
| 5,339,842 A | 8/1994 | Bok |
| 5,355,048 A | 10/1994 | Estes |
| 5,365,960 A | 11/1994 | Bran |
| 5,383,484 A | 1/1995 | Thomas et al. |
| 5,427,622 A | 6/1995 | Stansolvich et al. |
| 5,431,861 A | 7/1995 | Nagahiro et al. |
| 5,456,759 A | 10/1995 | Stanford, Jr. et al. |
| 5,464,480 A | 11/1995 | Matthews et al. |
| 5,520,205 A | 5/1996 | Guldi et al. |
| 5,533,540 A | 7/1996 | Stansasolovich et al. |
| 5,534,076 A | 7/1996 | Bran |
| 5,579,792 A | 12/1996 | Stansaslovich et al. |
| 5,911,837 A * | 6/1999 | Matthews .................. 134/2 |
| 6,017,827 A | 1/2000 | Morgan et al. |
| 6,178,973 B1 * | 1/2001 | Franca et al. ............. 134/1.3 |

OTHER PUBLICATIONS

Longenberger, Robert F., "Improvements to the Megasonic Cleaning of Silicon Wafers", Harris Semiconductor, pp. 1–15 (Jul. 1995).

Ridley, R.S. et al., "Advanced Aqueous Wafer Cleaning In Power Semiconductor Device Manufacturing", IEEE/SEMI Advanced Semiconductor Manufacturing Conference, pp. 235–242 (Aug. 1998).

* cited by examiner

*Primary Examiner*—Arun S. Phasge
(74) *Attorney, Agent, or Firm*—Jaeckle Fleischmann & Mugel, LLP

(57) ABSTRACT

The invention provides water enriched with ozone by generating ozone from oxygen using short-wavelength ultraviolet light and pumping the generated ozone under pressure through a 0.1-micron filter into a sealed housing of deionized water. The filter is fabricated of a material such as polytetrafluoroethylene which does not react with water and ozone. The filter apertures are sufficiently small to prevent the formation of gas bubbles in the outlet fluid. The highly-purified outlet fluid is usable immediately in semiconductor wafer cleaning.

28 Claims, 4 Drawing Sheets

SIMPLIFIED OZONATOR FOR A SEMICONDUCTOR WAFER CLEANER

CROSS-REFERENCED TO RELATED APPLICATIONS

This application is a continuation-in-part of U.S. patent application Ser. No. 09/344,867, filed Jun. 28, 1999 now U.S. Pat. No. 6,314,974.

BACKGROUND OF THE INVENTION

This invention relates in general to semiconductor wafer cleaning, and more specifically to processes and apparatus for dissolving ozone in deionized rinse water for cleaning and passivating a semiconductor wafer.

Once semiconductor wafers have been cleaned, it is important to provide a thin native oxide layer on the wafers as soon as possible in order to prevent contamination of the wafer during its fabrication. The process of forming this layer is termed surface passivation.

Native oxide readily forms on bare silicon wafer surfaces with or without ozone. When it is formed slowly or in an uncontrolled manner it will tend to incorporate high levels of $SiO_x$ particles or other contaminants. In prior art techniques, surface passivation is provided by hydrogen peroxide. It has been found, however, that hydrogen peroxide often contains undesirable metallic contaminants, reducing wafer yield or requiring additional cleaning steps.

Further prior art techniques expose the bare silicon wafer surface to high levels of ozone, forming a quick and clean native oxide on the surface. Such a native oxide layer can be provided by subjecting the wafers to a bath of ozone-rich water. In order to achieve a rapid silicon surface conversion to a native oxide, the ratio of ozone to water should be more than 7 parts per million.

Current techniques for ozonating water are, however, inadequate. Ozone quickly leaves the water bath and so the wafers do not receive the desired native oxide layer. Furthermore, the existing techniques for generating the ozone and ozonating the water are expensive, complex, and power-hungry.

SUMMARY

The invention provides a simple, inexpensive, ozone-generating and ozone-capturing apparatus and method for semiconductor wafer cleaning, which require less power than existing methods. The ozone generation apparatus and method uses ultraviolet light at a range of wavelengths concentrated at 185 nm to convert gaseous oxygen ($O_2$) to gaseous ozone ($O_3$). Oxygen gas is pumped into an optically-opaque chamber containing a short-UV high-intensity lamp. The lamp's ultraviolet light ionizes the molecular oxygen, converting it to ozone. The ozone is then pumped out of the chamber. The ozone-capturing apparatus and method uses a reverse polytetrafluroethylene (Teflon) filter. The filter is immersed in a housing of water. Ozone is pumped into the filter under pressure with a check valve to prevent the back flow of ozone. The receiving housing is filled with water and is likewise sealed. The ozone under pressure is forced out of the Teflon filter and into the surrounding water. The ozonated water is withdrawn from the base of the housing and is passed to a wafer ozone bath for applying the ozonated water to one or more semiconductor wafers. The ozonated water quickly produces on the wafers a thin layer of virtually contaminant free native oxide. This layer of native oxide aids in protecting the wafers from further contaminants during the further wafer processing. Note that native oxide is self-limiting in its growth, with the final thickness (usually<50 Å) dependent on the ambient temperature and pressure under which it is formed.

DETAILED DESCRIPTION OF THE INVENTION

Figure 1:
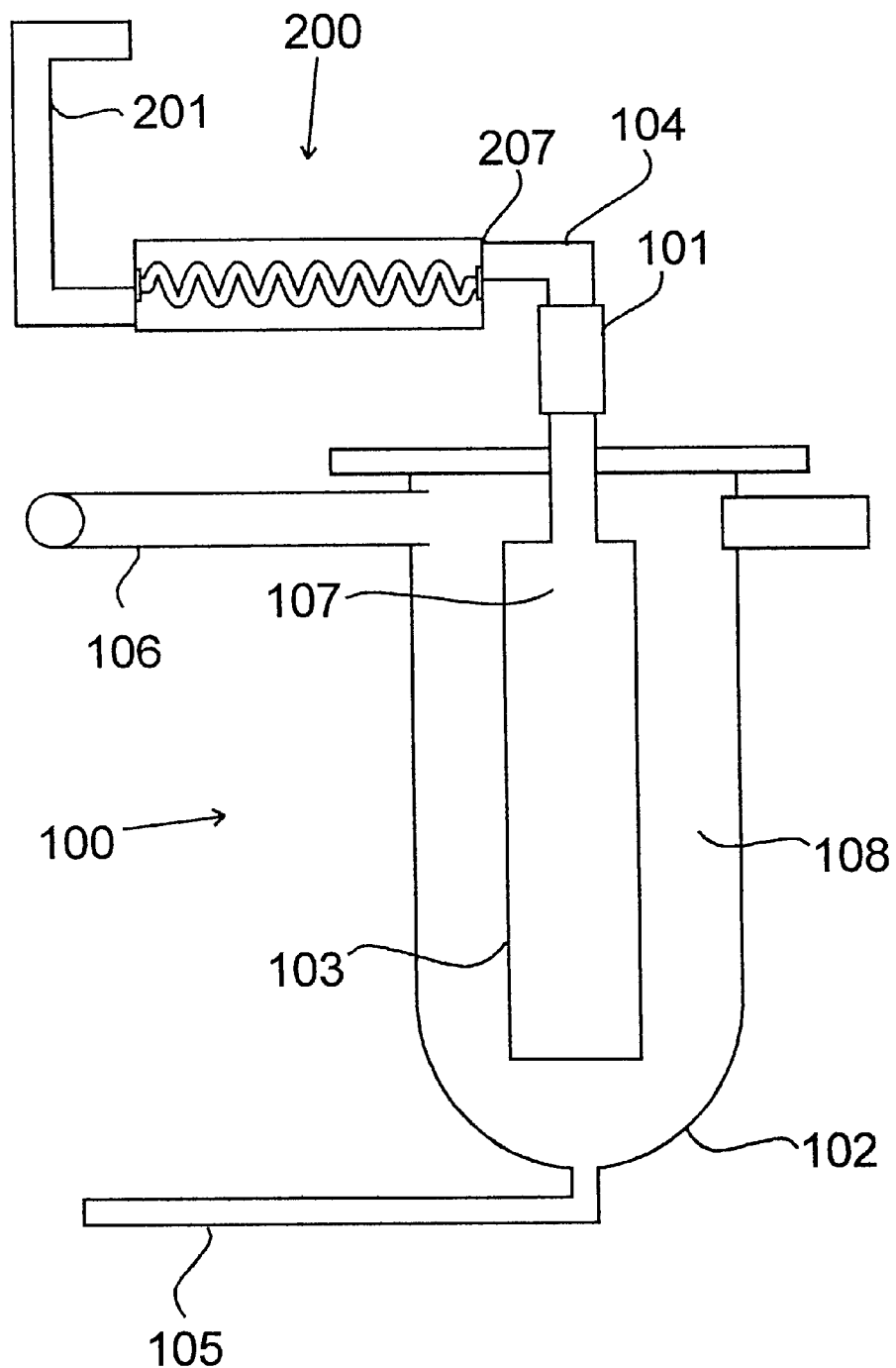
FIG. 1 is a diagram of the ozonator, including both the ozone-generating apparatus and the ozone-capturing apparatus.
Figure 1A:
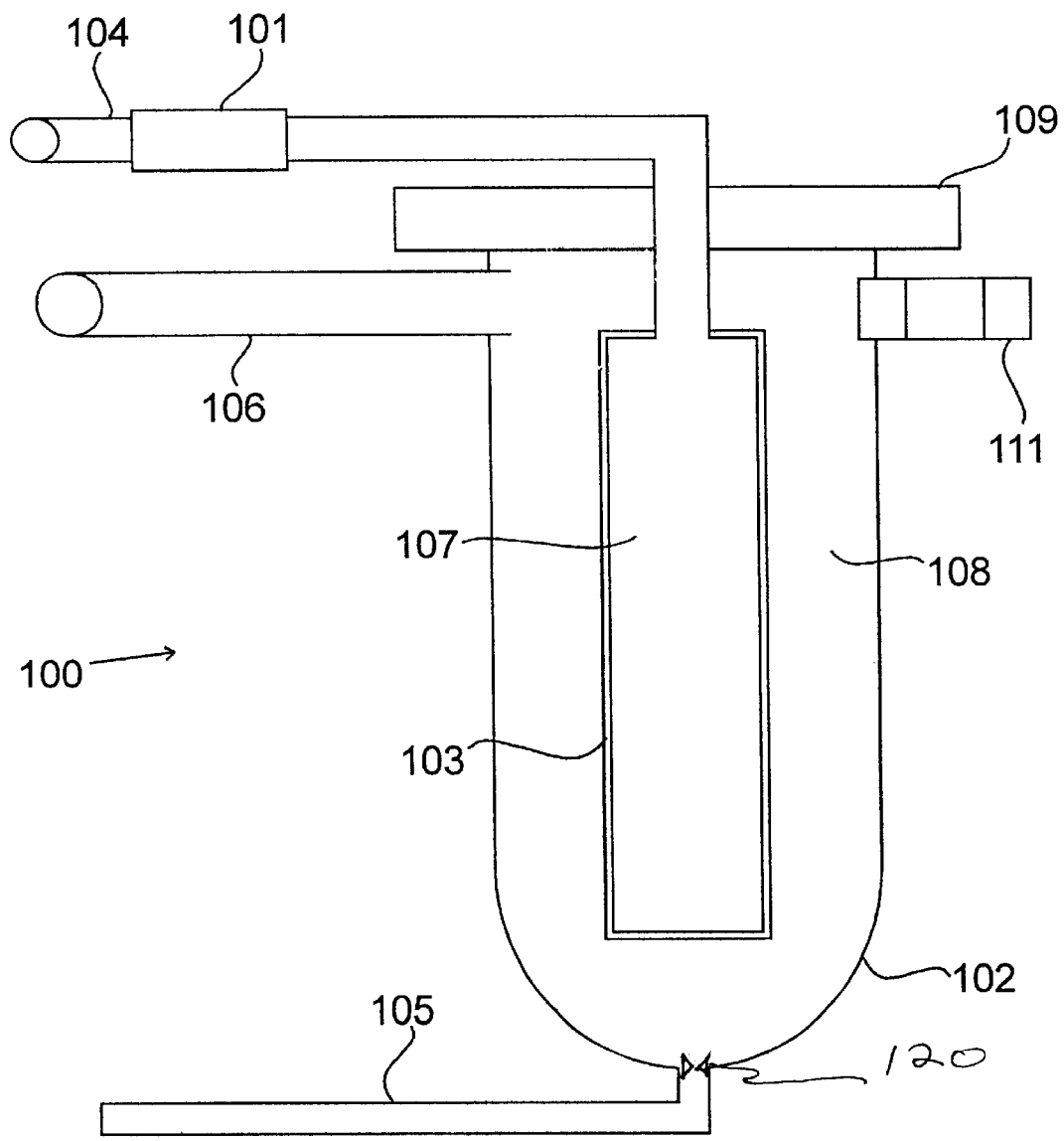
FIG. 1a is a diagram of the ozone-capturing apparatus alone.

FIGS. 1 and 1a show the invention's apparatus for generating ozone and dissolving the generated ozone into water. The invention comprises an ozone generator 200 and an ozonator 100, taking in gaseous oxygen and deionized water, and producing ozone dissolved in the deionized water. Refer first to FIG. 1. A source of oxygen (not shown) delivers oxygen gas via an inlet 201 into an ozone generator 200, which converts the oxygen to gaseous ozone using ultraviolet light. The ozone is then delivered under pressure to pressure to the ozonator 100, where it disperses and dissolves into deionized water. The pressure on the ozone gas dissolves the ozone in the deionized water. The ozonated deionized water leaves the ozonator to be used in semiconductor wafer cleaning.

The invention generates ozone using ultraviolet source illumination, employing ultraviolet-sensitive photosensors and circuits to drive an indicator to show that the ozone generator is in fact on and working. By contrast to an ordinary power-on indicator, the invention's circuit physically looks at the ultraviolet source independently to make sure it is alive. If the generator is running and the lamp fails, the indicator shows this fact immediately.

Figure 2:
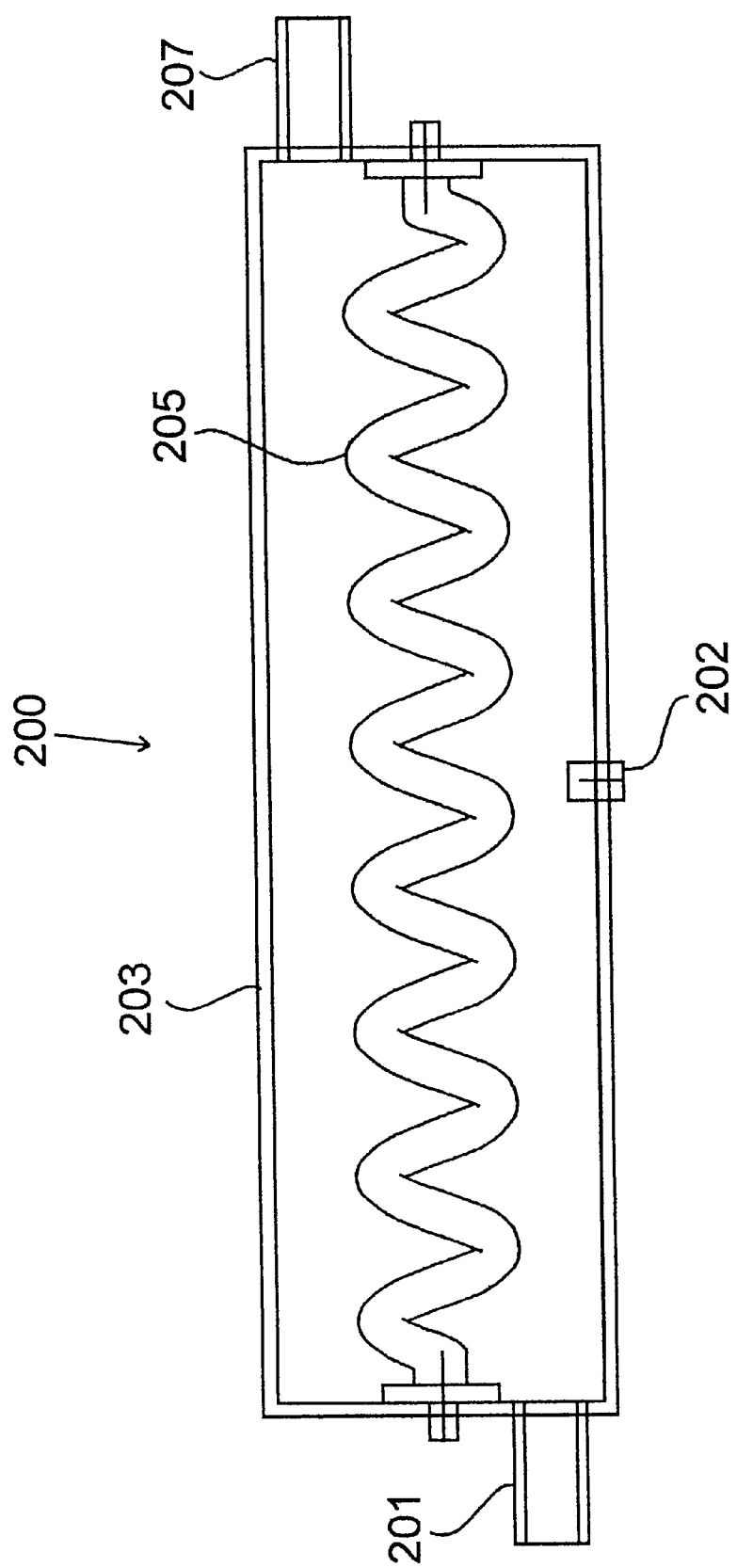
FIG. 2 is a diagram of the ozone-generating chamber showing a helical-bulb ultraviolet light source.

Refer to FIG. 2. In the inventive ozone generator 200, oxygen gas is pumped into an inlet 201 at one end of a stainless-steel-walled chamber 203 in which is mounted lengthwise a helical ultraviolet lamp 205 radiating short-wavelength (principally 185 nm) ultraviolet light. The ultraviolet lamp 205 is long, with quartz walls. The lamp 205 is mounted in a closed, stainless-steel chamber because any but the briefest exposure to short-wavelength ultraviolet radiation can burn human skin and eyes. The oxygen under pressure passes the length of the lamp to outlet 207. The ultraviolet light in the short wavelengths ionizes the oxygen, converting the molecular oxygen to molecular ozone. The converted ozone exits the chamber 203 via outlet 207 at the end opposite the inlet 201. The rate of pumping of oxygen into the chamber 203 is such as to cause the gas exiting the chamber 203 at the outlet 207 to be saturated ozone. An ultraviolet-sensitive photosensor 202 is used to drive an indicator to show that the ozone generator is in fact on and working. By contrast to an ordinary power-on indicator in the same circuit as the device being powered, the invention's circuit physically looks at the ultraviolet source independently to make sure it is alive. If the generator is running and the lamp stops producing ultraviolet light, the indicator shows this fact immediately even if the lamp is still drawing current.

Refer to FIG. 1a. The ozonator 100 includes a mixing container 102 and a sealing cover 109. An ozone inlet line 104 passes through the seal cover 109. The inlet line 104 has a one way gas check valve 101 for preventing reverse flow of ozone. The inlet line 104 is coupled to the dispersion filter 103. The filter 103 is located entirely withing the mixing container 102 and is surrounded by deionized water. The filter 103 has a central cylindrical chamber 107 that receives the ozone from the ozone inlet line 104. The filter 103 has a membrane that has pores of suitable size to permit passage of ozone from the chamber 107 into mixing region 108 of the mixing container 102. The membrane pores are sized to permit to prevent passage of water molecules into chamber 107. In the preferred embodiment the filter membrane is a 0.1 micron, polytetrafluoroethylene (Teflon) filter. The pore size may be greater to less than 0.1 microns so long as the pores are large enough to permit the passage of ozone and small enough to restrict the passage of water. The outlet of the mixing container has an orifice 120 for creating a back pressure in the mixing container 108. The orifice 120 may be fixed or variable in size. A variable orifice can be formed by a flow control valve that is either manually or automatically adjusted to provide a desired back pressure in mixing container 102. The ozonator dissolves the ozone gas in deionized water ($DIH_2O$).

In operation, the filter 103 serves as a boundary surface between an inner volume 107 and an outer volume 108 in container 102. Ozone is introduced under pressure into inner volume 107 through inlet line 104 having an in-line check valve 101. Highly deionized water is introduced from inlet line 106 into outer volume 108 in container 102. Filter 103 allows the pressurized ozone inside the inner volume 107 to dissolve into the water in outer volume 108, thereby ozonating the water. The ozonated water is then discharged through discharge outlet 105, and pumped into a container holding semiconductor wafers requiring surface passivation. An orifice 120 is located at the outlet of the ozonator and is in fluid communication with the discharge line 105. The orifice is restricted in cross-section relative to the inlets 104 and 106. This restriction maintains pressure in container 102 at a level which will insure that the concentration of dissolved ozone in the outlet ozonated water is at least 7 parts per million. The purity of the invention's output enables the wafer surfaces to be rapidly oxidized, leaving on each wafer a thin oxide layer with virtually no metallic or organic contamination. In an alternate embodiment, there orifice is eliminated and the discharge line 105 provides the necessary back pressure by having a diameter smaller than the diameter of the water inlet line 106.

Since the ozone dissolves into the water in a sealed container 102, there is little or no free ozone mixed with the discharge fluid. The ozonating operation is normally carried out at a temperature of about 20 degrees C.±2 degrees C. If desired, the temperature of the intake water can be controlled to vary the amount of ozone in the discharge. Lower temperatures will result in more ozone dissolving in the water. In the preferred embodiment, the discharge fluid from orifice 130 is at least 7 parts per million of ozone.

Figure 3:
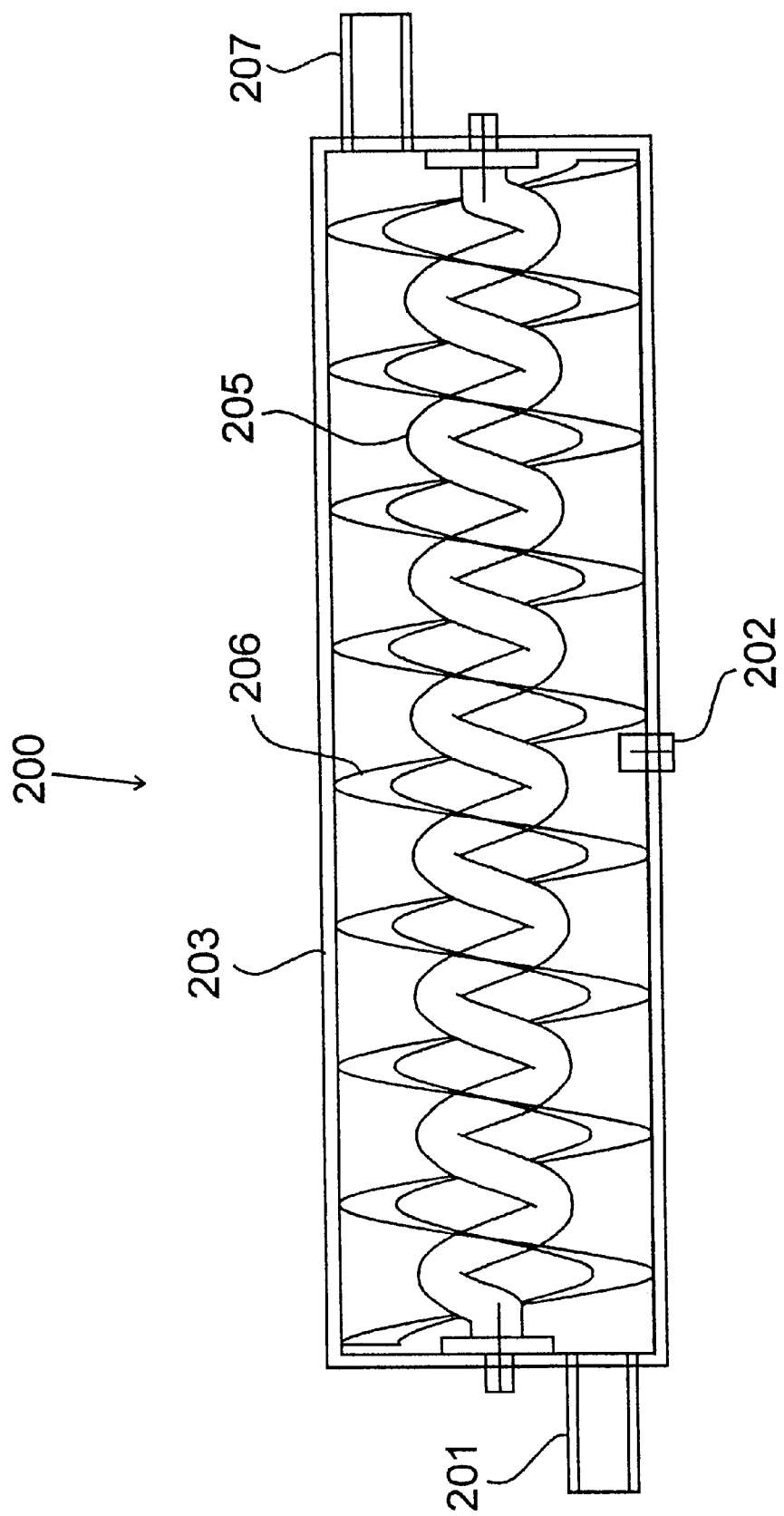
FIG. 3 is a diagram of the ozone-generating chamber showing a helical-bulb ultraviolet light source, with a baffle to control the direction of gas flow through the chamber.

Refer to FIG. 3, which shows an alternate embodiment of the ozone generator chamber. In this embodiment, the chamber 203 is fitted with a helical stainless steel baffle 206 that causes the gases moving through the chamber to move more nearly tangentially parallel to the helical contour of the lamp 205. The inner diameter of the baffle 206 is sufficiently large to permit removal and replacement of the lamp 205 along its longitudinal axis whenever necessary.

Existing ozone generation methods for semiconductor wafer ozonators cost well above $50,000, and generate ozone by electrical arcing between plates. The invention's method, by contrast, is a clean way of generating ozone which, in combination with the invention's ozonator, is inexpensive both to purchase and to operate.

The above examples are not intended to limit the spirit and scope of the invention. Those skilled in the art understand that further additions, modifications and changes may be made to the invention without department from the appended claims.

What is claim is:

1. An apparatus for generating ozonated water comprising:
    a first container sealed from ambient atmosphere for holding fluid and having first and second inlets;
    a first inlet to the first container for receiving ozone;
    a second inlet to the first container for receiving deionized water;
    an ozone dispersion filter connected to the first inlet and disposed in a second container sealed from ambient atmosphere for dissolving ozone into the water in the first container;
    an outlet connected to the second container for removing ozonated water from the second container.

2. The apparatus of claim 1 wherein the filter comprises polytetrafluoroethylene.

3. The apparatus of claim 1 wherein the filter apertures are of approximately 0.1 micron in size.

4. The apparatus of claim 1 wherein the filter apertures are of such a size as to prevent the passage of water into the second container and to permit the passage of gaseous bubbles of ozone into the water in the first container.

5. The apparatus of claim 1 incorporating a means for maintaining the temperature of the deionized water at approximately 20 degrees centigrade.

6. The apparatus of claim 1 further comprising a check valve connected between the first inlet and the source of ozone for preventing a reverse flow of ozone out of the first inlet to the source of ozone.

7. The apparatus of claim 1 wherein the ozone dispersion filter is surrounded by water.

8. The apparatus of claim 1 wherein the sealed container includes one dispersion filter.

9. An apparatus for generated ozonated water comprising:
    a first container sealed from the atmosphere for holding gases;
    an ultraviolet lamp mounted in the first container;
    an electrical power source outside the first container and connected to the ultraviolet lamp;
    an inlet to the first container for receiving oxygen;
    an outlet from the first container for removing ozone;
    a check valve connected to the outlet from the first container for preventing the flow of ozone back into the first container;
    a second container sealed from the atmosphere for holding fluid and having first and second inlets;
    a first inlet to the second container connected to the check valve for receiving ozone;
    a second inlet to the second container for receiving deionized water;
    an ozone dispersion filter connected the first inlet and disposed in the second sealed container for dissolving ozone into the water in the second container;
    an outlet connected to the second container for removing ozonated water from the second container.

10. The apparatus of claim 9 further comprising an oxygen container with an outlet for delivering oxygen to and an ultraviolet lamp coupled between the outlet of the oxygen container and the inlet to the mixing container for converting oxygen to ozone.

11. The apparatus of claim 9 wherein the filter comprises polytetrafluoroethylene.

12. The apparatus of claim 9 wherein the filter apertures are of approximately 0.1 micron in size.

13. The apparatus of claim 9 wherein the filter apertures are of such a size as to prevent the passage of water into the second container and to permit the passage of gaseous bubbles of ozone into the water.

14. The apparatus of claim 9 wherein the ultraviolet lamp is helical in shape.

15. The apparatus of claim 9 wherein the ultraviolet lamp emits ultraviolet light strongly at an approximate wavelength of 185 nanometers.

16. The apparatus of claim 9 wherein a photosensor is mounted in the first container so as to detect ultraviolet emissions from the ultraviolet lamp.

17. The apparatus of claim 16 wherein the photosensor is connected to an indicator on a circuit independent from the power circuit of the ultraviolet lamp.

18. The apparatus of claim 9 further comprising a helical baffle for directing flow of oxygen from the inlet in a path substantially tangential to the helical form of the lamp.

19. The apparatus of claim 18 wherein the helical baffle has a central opening along its longitudinal axis of sufficient diameter to permit axial removal and replacement of the lamp.

20. The apparatus of claim 7 further comprising means for maintaining the temperature of the deionized water at approximately 20 degrees centigrade.

21. A method for generating ozonated water comprising the steps of:

delivering oxygen into a first container;

exposing the oxygen to ultraviolet light, thereby converting the oxygen to ozone;

delivering the ozone out of the first container;

delivering deionized water into a second container sealed from ambient atmosphere;

delivering the ozone into a filter in the second container at a pressure greater than the pressure of the water for dissolving the ozone into the water;

withdrawing ozonated water from the second container through a restricted orifice in order to maintain the pressure in the housing so as to dissolve the ozone into the water in a proportion equal to or greater than 7 parts per million.

22. The method of claim 21 wherein the temperature of the water is held at approximately 20 degrees centigrade plus or minus two degrees centigrade.

23. The method of claim 22 wherein the wavelength of a significant proportion of the ultraviolet light is approximately 185 nanometers.

24. A method for generating ozonated water comprising the steps of:

pumping deionized water into a container sealed from ambient atmosphere;

pumping ozone into a filter in the container at a pressure greater than the pressure of the water;

withdrawing ozonated water from the container through a restricted orifice in order to maintain the pressure in the housing so as to dissolve the ozone into the water in a proportion equal to or greater than 7 parts per million.

25. The method of claim 24 wherein the temperature of the water is held at approximately 20 degrees centigrade plus or minus two degrees centigrade.

26. An apparatus for dissolving ozone in water comprising:

a mixing container for holding water under pressure and having first and second inlets;

the first inlet for receiving ozone and the second inlet for receiving deionized water;

an ozone dispersion filter connected to the first inlet and having openings small enough to pass ozone into the mixing container and to prevent passage of water from the mixing container into the first inlet in order to dissolve ozone into the deionized water in the mixing container;

an outlet connected to the mixing container for removing ozonated water from the mixing container, said outlet being smaller in size than the second inlet in order to maintain a back pressure on the contents of the mixing container.

27. An apparatus for generating ozonated water comprising:

a mixing container for holding fluid under pressure and having first and second inlets;

the first inlet to the mixing container for receiving ozone and the second inlet to the mixing for receiving deionized water;

an ozone dispersion filter connected to the first inlet and having openings small enough for passing ozone into the mixing container and for preventing water from passing into the first inlet in order to dissolve ozone into the deionized water in the mixing container;

a variable size outlet connected to the mixing container for removing ozonated water from the first container and adjustable to maintain a back pressure on the mixing container.

28. A method for generating ozonated water comprising the steps of:

delivering oxygen into a first container;

exposing the oxygen to ultraviolet light, thereby converting the oxygen to ozone;

delivering the ozone out of the first container;

delivering deionized water into a mixing container;

delivering the ozone into a filter in the second container for dissolving the ozone into the water;

withdrawing ozonated water from the second container through a restricted orifice in order to maintain the pressure in the mixing container in order to dissolve the ozone into the water.

* * * * *

UNITED STATES PATENT AND TRADEMARK OFFICE
CERTIFICATE OF CORRECTION

PATENT NO. : 6,399,022 B1 Page 1 of 1
DATED : June 4, 2002
INVENTOR(S) : Malcolm R. Schuler et al.

It is certified that error appears in the above-identified patent and that said Letters Patent is hereby corrected as shown below:

<u>Column 2,</u>
Lines 29-30, delete repeat of words "to pressure";

<u>Column 3,</u>
Line 24, insert a space between DI and H20;
Line 45, delete "there" and replace with -- the --;
Line 52, in the equation "C.±2" remove the period between C and ± 2 to read
-- C±2 --.

Signed and Sealed this

Eleventh Day of February, 2003

JAMES E. ROGAN
*Director of the United States Patent and Trademark Office*

UNITED STATES PATENT AND TRADEMARK OFFICE
Certificate

Patent No. 6,399,022 B1                                                Patented: June 4, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Malcolm R. Schuler, Mountaintop, PA; Rodney S. Ridley, Mountaintop, PA; Thomas E. Grebs, Mountaintop, PA; Robert F. Longenberger, Chickshinny, PA; and Raymond J. Webb, Mountaintop, PA.

Signed and Sealed this Fourth Day of May 2004.

*NAM NGUYEN*
*Supervisory Patent Examiner*
Art Unit 1753